United States Patent
Blander et al.

(10) Patent No.: US 7,512,518 B2
(45) Date of Patent: Mar. 31, 2009

(54) METHOD FOR MEASURING THIN LAYERS IN SOLID STATE DEVICES

(75) Inventors: Alexandre Blander, Pierrefonds (CA); Richard Brassard, Shefford (CA); Carl Savard, Bromont (CA); Julien Sylvestre, Chambly (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/780,064

(22) Filed: Jul. 19, 2007

(65) Prior Publication Data

US 2008/0021673 A1 Jan. 24, 2008

(30) Foreign Application Priority Data

Jul. 20, 2006 (CA) .................................. 2552623

(51) Int. Cl.
*G06F 15/00* (2006.01)
(52) U.S. Cl. ........................................ 702/171; 702/170
(58) Field of Classification Search .................. 73/570, 73/584, 596, 606, 607; 702/170, 171
See application file for complete search history.

(56) References Cited

U.S. PATENT DOCUMENTS

| | | | |
|---|---|---|---|
| 4,442,714 A | 4/1984 | Bonjianni | |
| 5,344,236 A | 9/1994 | Fishman | |
| 5,754,493 A * | 5/1998 | Al-Chalabi | 367/38 |
| 5,974,886 A * | 11/1999 | Carroll et al. | 73/598 |
| 5,982,482 A | 11/1999 | Nelson et al. | |
| 6,840,107 B2 | 1/2005 | Siong | |
| 6,890,302 B2 | 5/2005 | Oravecz et al. | |
| 2003/0101820 A1 | 6/2003 | Siong | |

OTHER PUBLICATIONS

"Acoustical Imaging Evaluation of Thin Metal-Metal Adhesive Bonds" E. Yu. Maeva, I. A. Severina, A.S. Bagaev, F.M Severin, and R. Gr. Maev. 0-7803-7922-5/03/ (c) 2003 IEEE, 2037-2003 IEEE Utrasonics Symposium.

* cited by examiner

*Primary Examiner*—Edward R Cosimano
*Assistant Examiner*—Douglas N Washburn
(74) *Attorney, Agent, or Firm*—Anthony J. Canale

(57) ABSTRACT

A method of using acoustic signals in the form of waves or pulses to non-destructively measure the thickness of a bonding layer sandwiched between and bonding together overlying and underlying materials different from the bonding layer especially when the thickness of the bonding layer is so small that the features (maxima, minima, time position) of the echo from the interface of the bonding layer and the overlying material is indistinguishable, i.e., not independently observable from the features (maxima, minima, time position) of the echo from the interface of the bonding layer and the underlying material.

19 Claims, 10 Drawing Sheets

METHOD FOR MEASURING THIN LAYERS IN SOLID STATE DEVICES

FIELD OF THE INVENTION

This invention generally relates to a reflective acoustic microscopy method for measuring the thickness of bonding layers in a body, used to bond together elements especially in solid-state or microelectronic devices.

BACKGROUND OF THE INVENTION

The complexity and compactness of present day electronic devices requires the inclusion of thin bonding layers in various circuit configurations such as may be used to secure a semiconductor device to a heat sink or cap. Measurement of the thickness of such bonding layers is essential to assure that the devices will not only function properly but also will operate within their design parameters especially as regards the device heat transfer requirements, Several methods presently exist for measuring the thickness of such bonding layers. An early but destructive, time-consuming method requires the cutting of the device transverse to the thickness of the buried layer and then optically measuring the thickness of the exposed buried layer. Non-destructive bonding layer thickness measurements by optical methods provide quick feedback and ensure quality. However, certain assemblies make optical measurements of the bonding layer thickness impossible.

More recently, a non-destructive method employing acoustic waves, from an acoustic microscope, has become available. Such acoustic methods can easily provide accurate thickness measurements of materials when interface reflection echoes are resolved. This is simply done by first measuring the acoustic longitudinal velocity of the bonding material and then measuring the time separation between reflected echoes.

This process provides good results only when the bonding layer is thick enough such that echo separation at both layer interfaces can be observed. Recently, Fast Fourier Transform (FFT) methods have also been employed to measure thin layer thicknesses, however these methods have yet to be successfully and robustly applied to thin bonding layers. By thin layers it is meant that the reflected acoustic signals returning from the layer are usually merged into one single echo making thickness measurements by conventional techniques very imprecise or impossible, for the reflections from both the top and the bottom of such thin bonding layers overlap another, such that the signal reflected from the top of the bonding layer cannot be differentiated from the signal reflected from the bottom of the bonding layer.

As newer, smaller semiconductor devices require bonding layers that are thinner than the threshold thickness where top and bottom echoes begin to separate, the prior art techniques are unsatisfactory and the art has been seeking a measurement technique that would provide for accurate non-destructive measuring of such thin bonding layers.

BRIEF SUMMARY OF THE INVENTION

The present invention is directed to a method of using acoustic waves or pulses to non-destructively measure the thickness of a bonding layer sandwiched between and bonding together overlying and underlying materials different from the bonding layer. The term "wave" is employed in the following description of the present invention as the physical definition utilized in the prior art, in particular, "pulses" are included in the definition of waves as a special case of a wave having a finite duration.

More particularly, the present invention sets forth a method of non-destructively and accurately measuring the thickness of a bonding layer that is contained within a solid body, when the thickness of the bonding layer is so small that the primary echo from the first interface and the secondary echo from the secondary interface are undistinguishable. That is, the features (maxima, minima, time position) of the echoes are not independently observable with a signal detector or other apparatus such as an oscilloscope.

The method of the present invention thus will enable one to determine the precise thickness measurement of such an intermediate bonding layer regardless of a thickness of the bonding layer.

An embodiment of the present invention accomplishes this by applying a wave or a pulse, from an acoustic microscope, to the layered body that will cause a primary echo to be reflected from the interface between the bonding material and the top or overlying material and cause a secondary echo to be reflected from the interface of the bonding material and the underlying material; detecting and digitizing the echoes to generate a digital time series containing both echoes, processing the digital time series to remove any noise there from; digitally filtering the time series for the primary echo; locating the time position and amplitude of the maximum of the filtered, primary echo time series; time-translating and scaling the primary echo using the time position and amplitude obtained from the localization; subtracting the transformed model of the primary echo from the time series to obtain a cleaned time series without the primary echo; digitally filtering the cleaned time series using a filter for the secondary echo; locating the time position of the maximum of the secondary echo filtered time series; determining the flight time, i.e., the time used by the acoustic wave to travel back and forth in the bonding layer from the difference between the time locations of the primary and secondary echoes from the time positions of the maxima of the two filtered time series; and determining the thickness of the bonding layer of the body which is equal to one half of the measured flight time multiplied by the velocity of the acoustic wave in the bonding layer.

These and other aspects, features, and advantages of the present invention will become further apparent from the following description taken in conjunction with the drawings.

BRIEF DESCRIPTION OF THE SEVERAL VIEWS OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
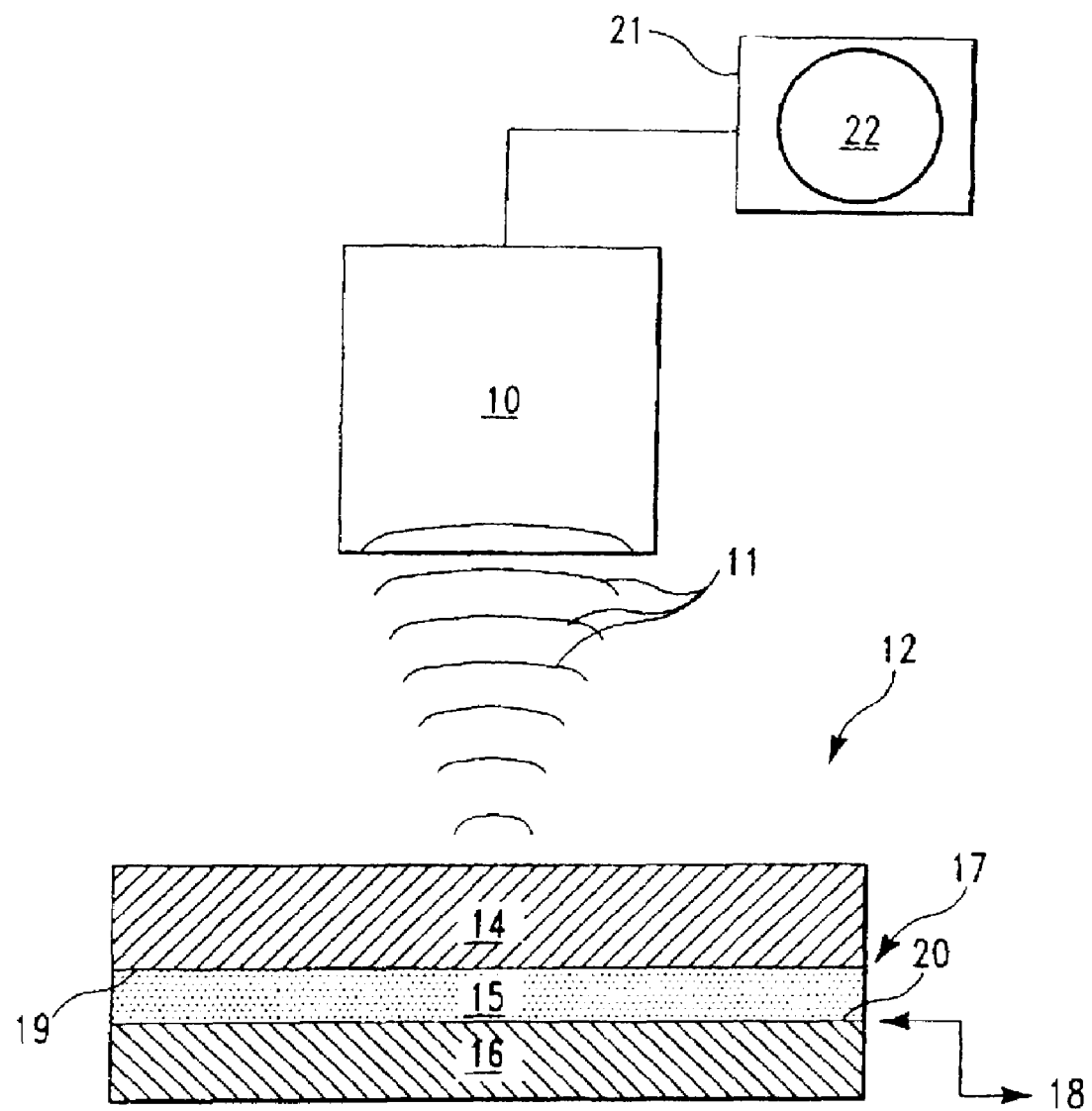
FIG. 1 schematically illustrates an acoustic microscope, coupled to a computer and an oscilloscope, applying acoustic waves to the surface of a body comprised of a first material secured to a second material by an intermediary bonding layer.
Figure 2:
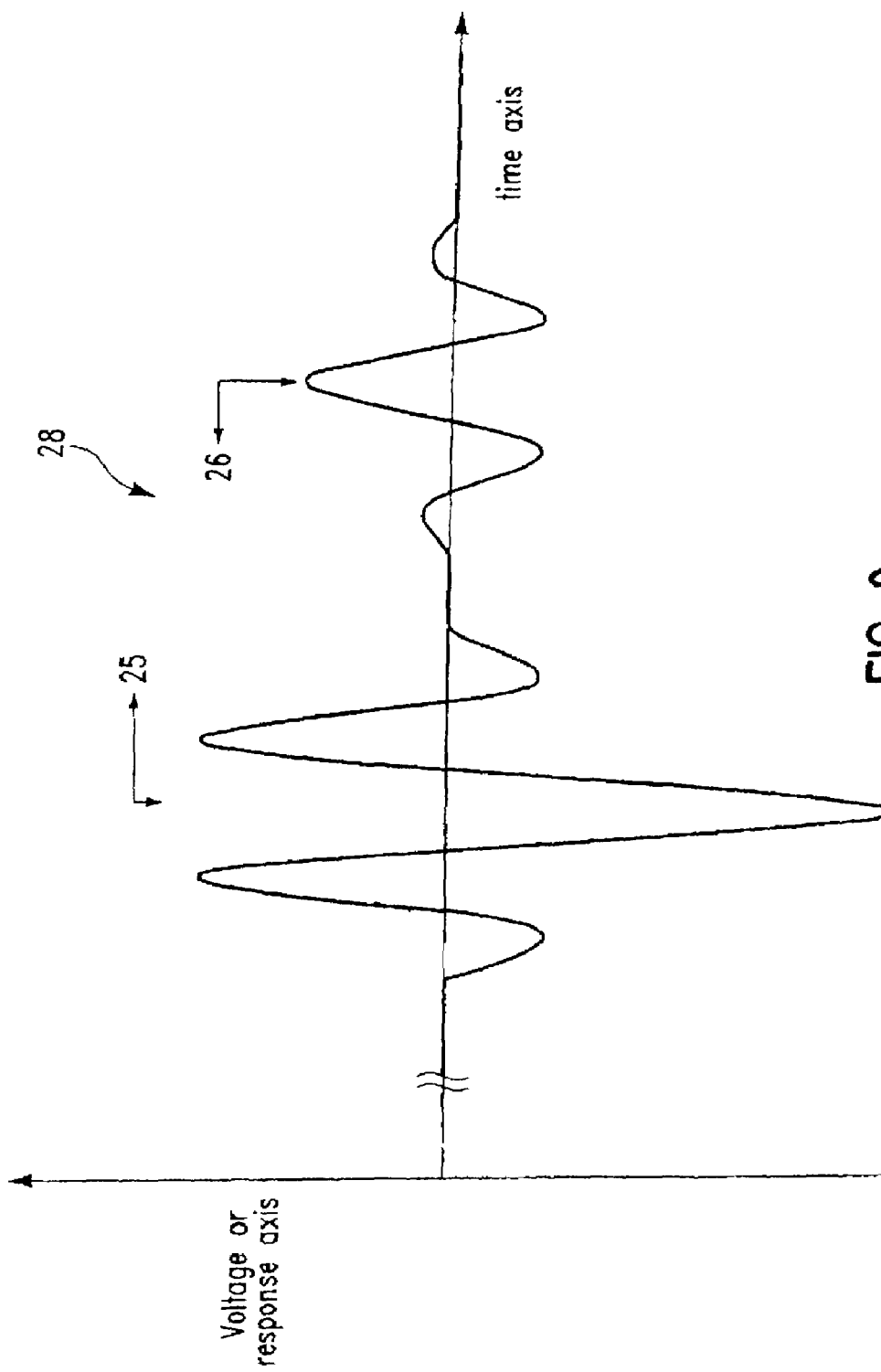
FIG. 2 shows the oscilloscope display of acoustic signals reflected from a body containing a bonding layer of a thickness sufficient to create widely separated primary and secondary echoes.

FIG. 1 schematically illustrates a commercially available acoustic microscope 10 coupled to a computer 21 provided with an oscilloscope display 22. The microscope 10 is designed to transmit an acoustic wave 11 to a layered body 12 and to receive and process the echoes reflected there from. The layered body 12 is, for example, comprised of an upper layer 14 formed of a first material such as SiSiC, that is secured to a lower layer 16, formed, for example, of silicon, by an intermediate bonding layer 15, formed, for example, of a bonding material such as a thermal paste. More particularly, the bonding layer 15 forms a reflective or echoing interface 17 with the bottom surface 19 of the upper layer 14 and a subsequent reflective or echoing interface 18 with the top surface 20 of the lower layer 16. When an acoustic wave is applied to the body 12 the wave is reflected from each of the two interfaces 17 and 18 as shown in FIG. 2. Such reflected waves will hereinafter be referred to as echoes. Thus a first or primary echo 25 is reflected from the first or upper interface 17 and a secondary echo 26 is reflected from the second or lower interface 18. When the interfaces 17 and 18 are separated by a bonding layer that is thick enough, the echoes 25 and 26 are widely separated and form distinct portions of the signal 28 shown in FIG. 2. Because the echoes 25 and 26 are widely separated, they are clearly distinguishable one from the other. It should be understood that, in this FIG. 2, the polarity is illustrative and the amplitude and time position of the signals 25 and 26 are not to scale.

More generally, the echoes 25 and 26 can be generated by applying any time-varying driving force on the layered body 12, i.e., not necessarily an acoustic wave 11.

Figure 3:
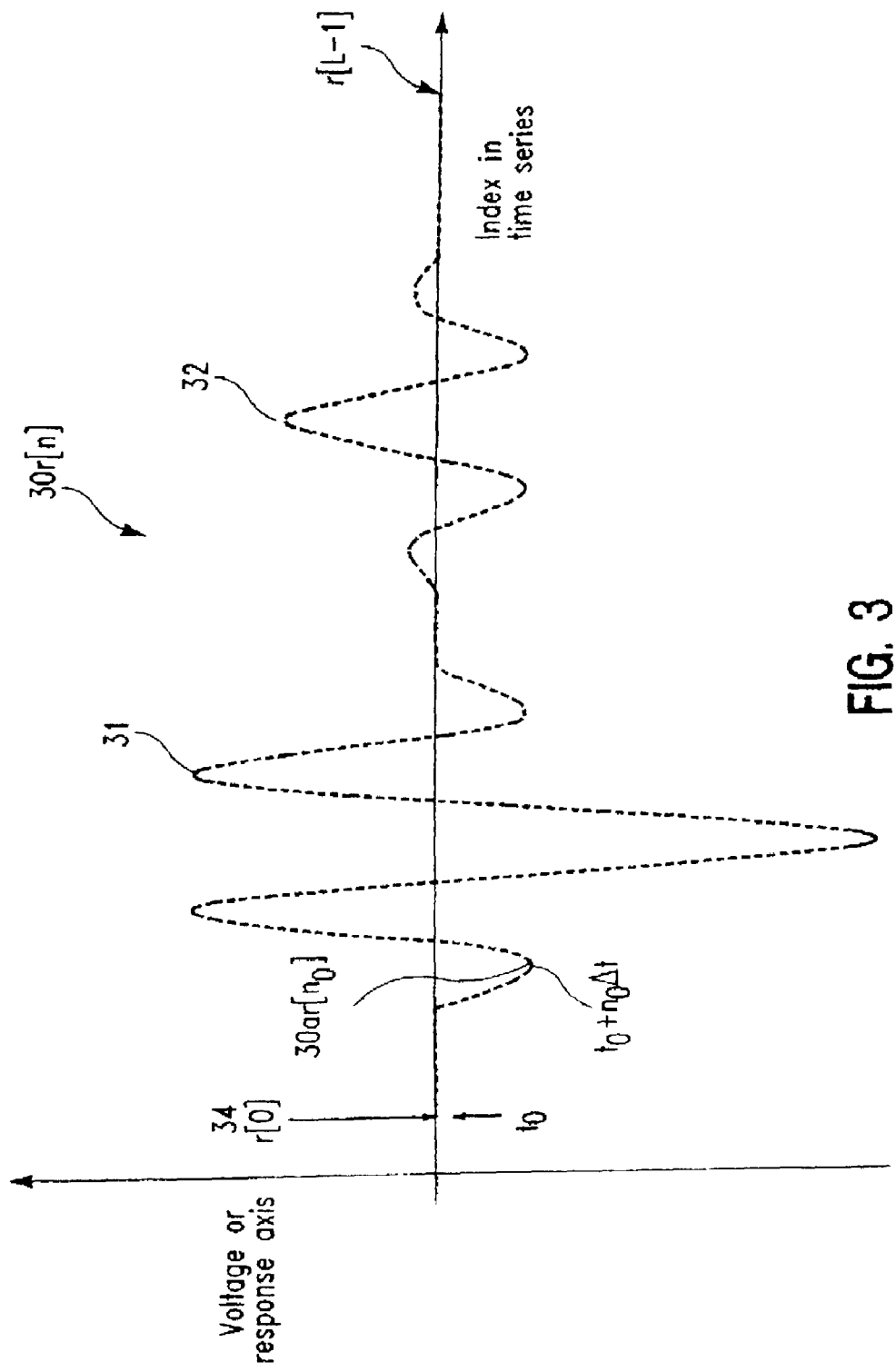
FIG. 3 illustrates the primary and secondary echoes shown in FIG. 2, after they have been digitized into respective time series.

The computer 20 is now used to convert, or digitize, the analog acoustic signal 28 into a digital time series 30 as shown in FIG. 3 in which signals 31 and 32 respectively are the signals 25 and 26 in digitized form. This time series 30 has an amplitude or voltage associated with each point in time. Digitizing of such signals can be performed using any one of a number of various techniques known to the art.

Figure 4:
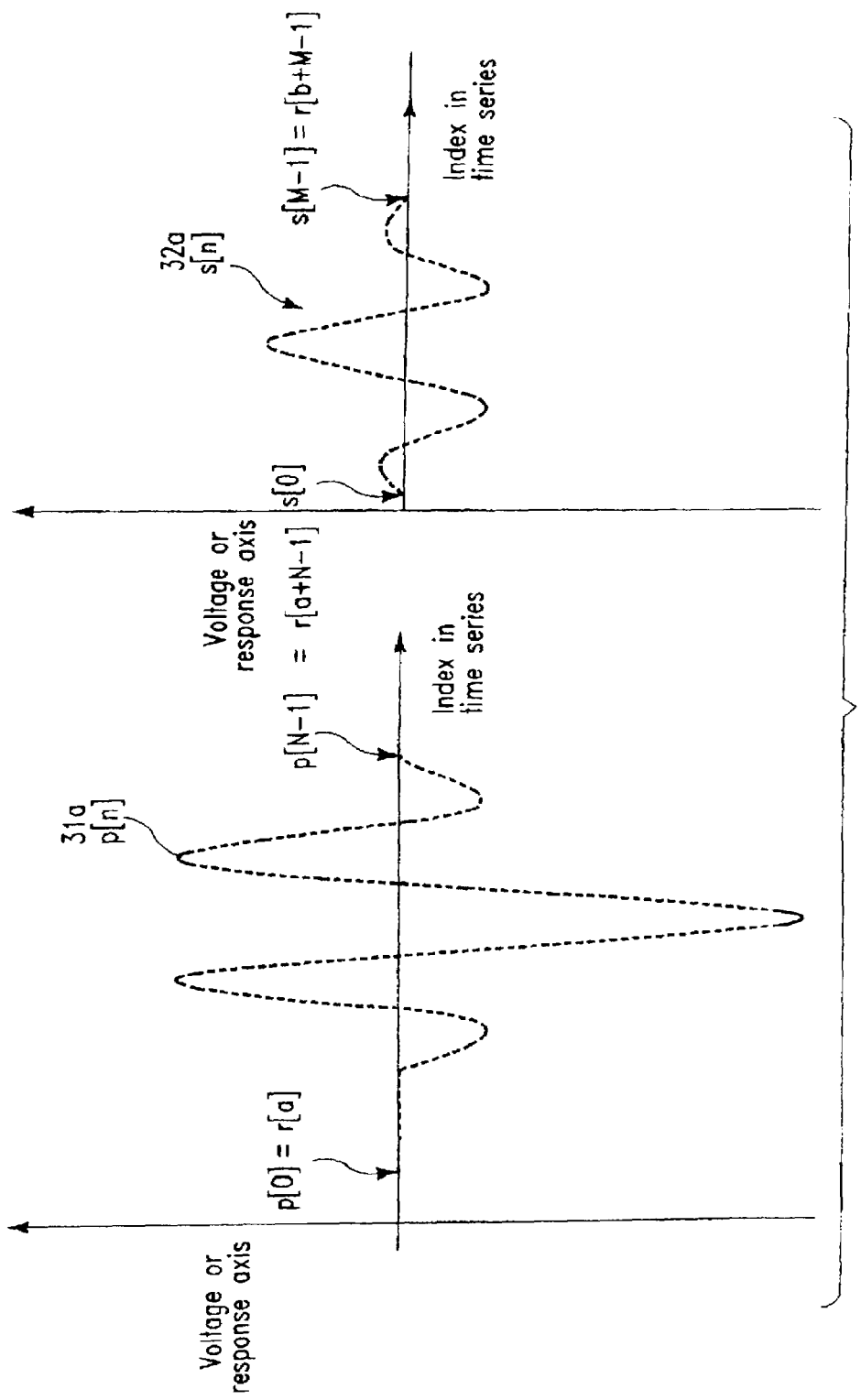
FIG. 4 shows the primary and secondary echoes digital models taken from the time series shown in FIG. 3.

The individual portions 31 and 32 of the digitized time series 30 can now be easily separated into respective digital signal models 31a and 32a by simply truncating the data from the digitized signals as shown in FIG. 4.

The digitized time signal 30 termed r [n] in FIG. 3, identifies a time series indexed by the integer n, so that the datum r [0] corresponds, at node 34, to the signal amplitude at the initial time $t_0$, while $r[n_0]$, at node 34a in FIG. 3, corresponds to the signal amplitude at time $t_0+n_0 \Delta t$, for a sampling period $\Delta t$ in the digitization process. Therefore, in FIGS. 3, 4, 7, and 8 the digitized time series will be plotted with respect to their integer time index. Square brackets will hereafter be used to identify time series indexed by integers, as defined above. r[n] is assumed to contain a total of L data points. Thus the well separated echoes 25 and 26 of FIG. 2 are translated into two distinct digitized, independent sub-series or sub-time series of r[n], 31 and 32, that respectively correspond to the primary and secondary echoes 25 and 26 of FIG. 2.

The digitized signal model 31 corresponds to the primary echo 25 and the digitized signal model 32 corresponds to the secondary echo 26. These signals can now be truncated from the digitized time series 30 of FIG. 3. It is to be remembered these digitized models have been attained from a bonding layer which is sufficiently large such that the primary and secondary echoes are fully distinguishable one from the other as illustrated in FIG. 2, i.e., the echoes do not overlap in time. Accordingly the truncated digitized primary echo 31a in FIG. 4 is thus termed p[n]=r [a+n] for n=0, 1, 2, . . . , N−1 and some fixed a, this corresponds to step 92 in FIG. 9, while the digitized secondary echo 32a, in FIG. 4, is termed s[n]=r [b+n] for n=0, 1, 2, . . . , M−1 and some fixed b, this corresponds to step 93 in FIG. 9. N and M are the lengths of the primary and secondary echoes, respectively. It should once again be mentioned that both p[n] (31a of FIG. 4) and s[n] (32a of FIG. 4) are sub-series of 30 r[n] of FIG. 3, which itself is a digital representation of signal 28 in FIG. 2.

It should be understood that instead of using a body 12 with a large bonding layer 15, digital signal models of echoes 25 and 26 can also be calculated knowing key material properties such as density and acoustic impedance of the various layers of the assembly 12. Further, the digitized echoes 31a and 32a can be optionally processed with standard de-noising techniques. For instance, the digitized echoes 31a and 32a can be filtered to reduce the effect of noise in various frequency bands. Also a number of signals similar to signal 28, acquired from many measurements on the same part, or measurements from a plurality of different parts, can also be averaged together to reduce the effect of noise and other such interferences.

Figure 5:
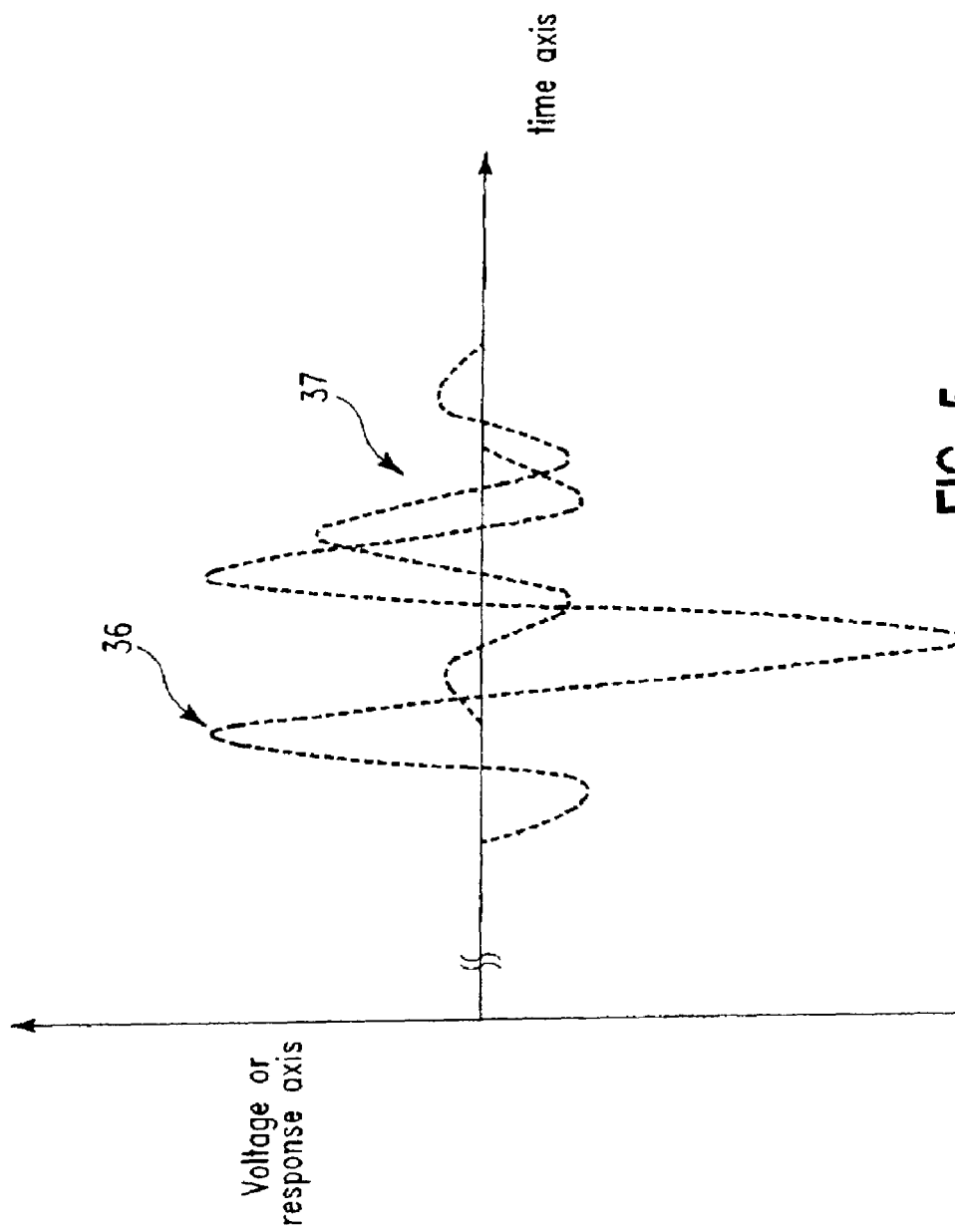
FIG. 5 shows the primary and secondary echoes returning from the body of FIG. 1 when the body contains a bonding layer whose thickness is so thin that the primary and secondary echoes there from overlap one another.

When the body, shown in FIG. 1, has a thin bonding layer 15, the reflected primary echo 36 and the reflected secondary echo 37 actually received by the oscilloscope from the respective interfaces 17 and 18 will not be fully distinguishable from one another as they are superimposed one upon the other as shown in FIG. 5.

Figure 6:
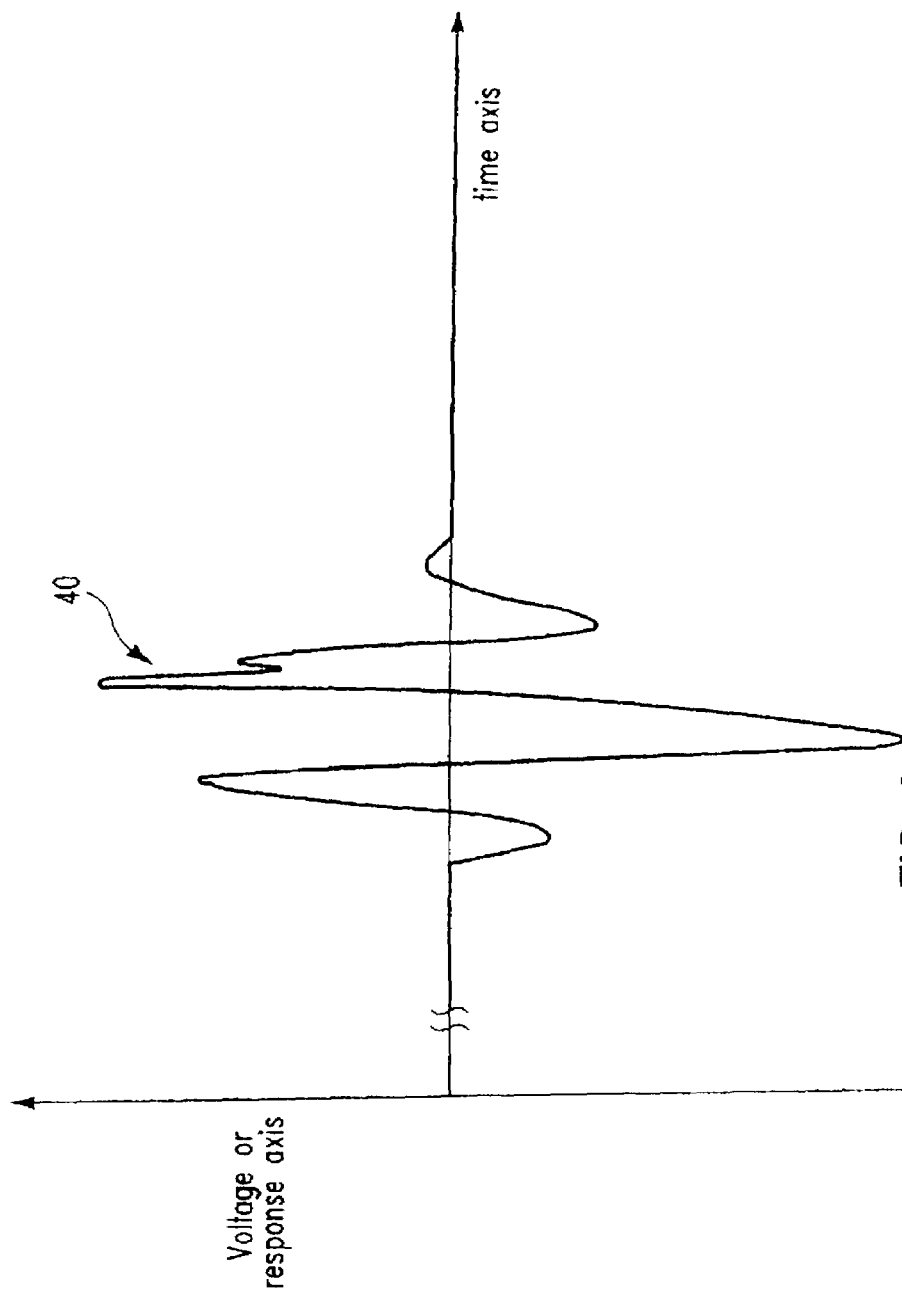
FIG. 6 shows what the oscilloscope actually displays of the primary and secondary echoes of FIG. 5 as received by the oscilloscope.

Because these signals are so superimposed, i.e. overlapping in time, the oscilloscope 22 cannot distinguish between them and cannot display them as individual signals but instead displays them as one single combined signal 40 as shown in FIG. 6. Thus the prior art time separation technique described above cannot be used to determine the thickness of such a thin bonding layer.

In accordance with the present invention there will now be described a method and technique for distinguishing between such superimposed signals so that thickness of thin bonding layers that create such overlapping indistinguishable displays can be established.

Figure 7:
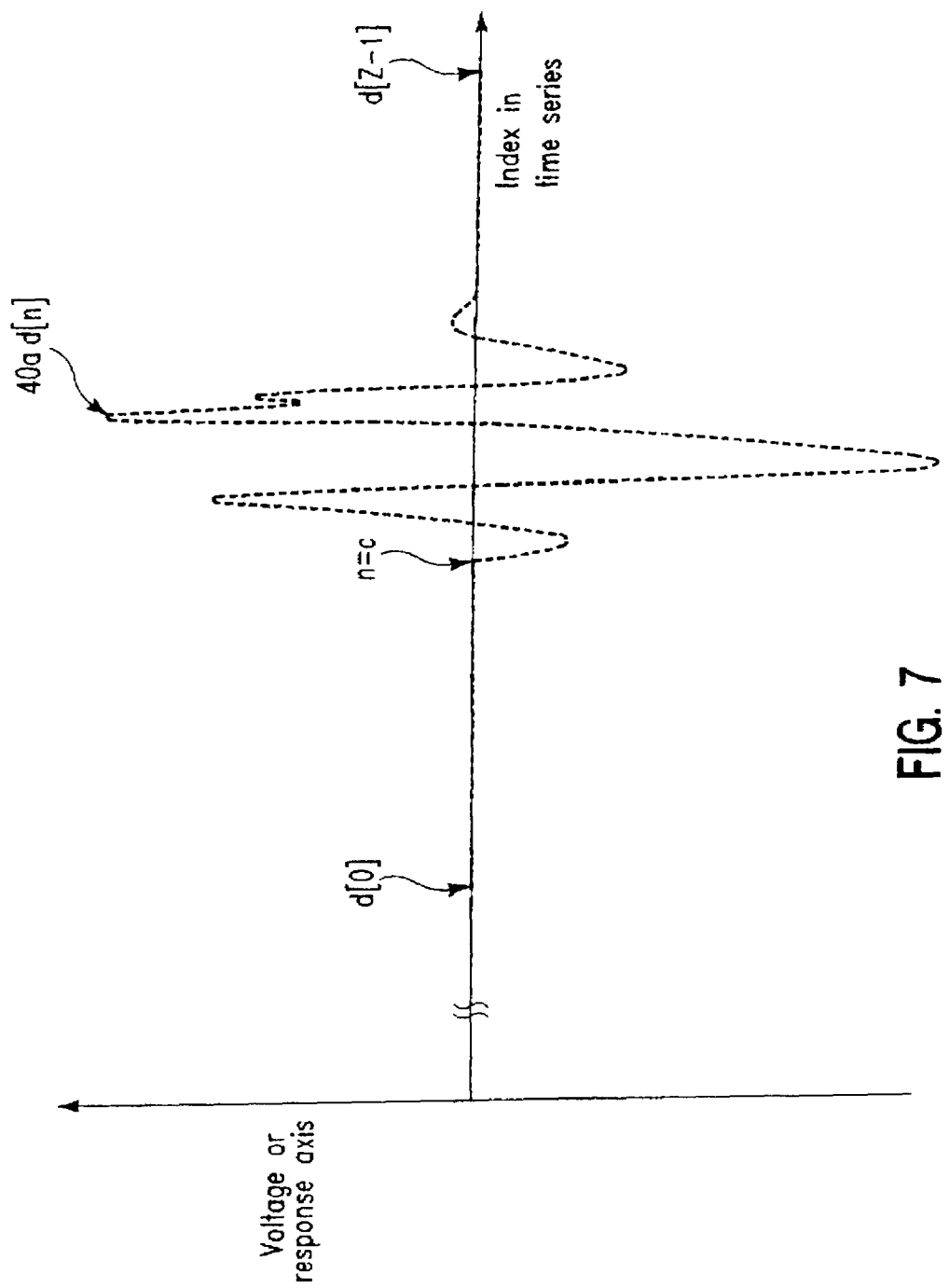
FIG. 7 shows the signal of FIG. 6, digitized into a time series.
Figure 8:
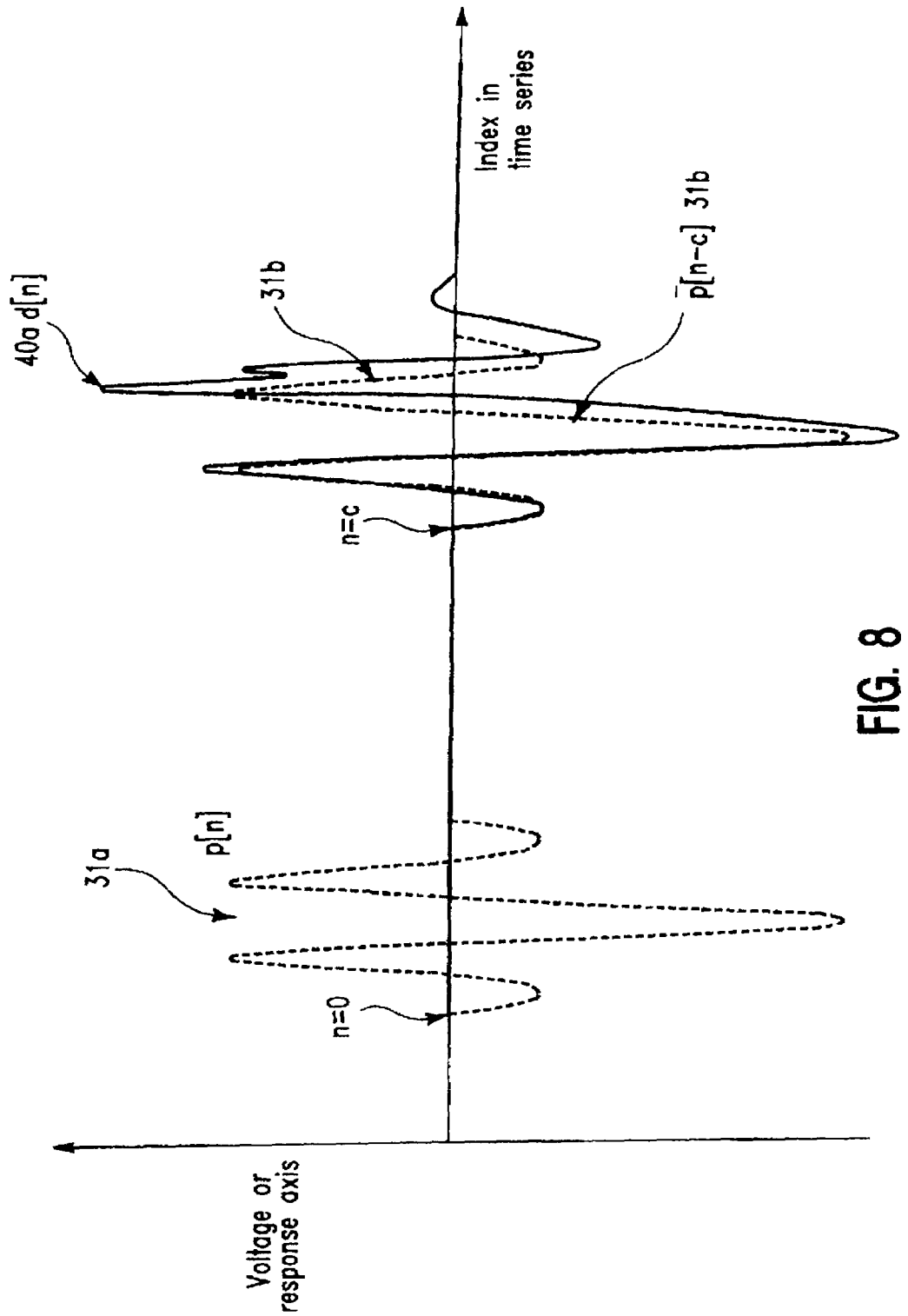
FIG. 8 shows how the time series shown in FIG. 7 is matched filtered by the digital model of the primary echo shown in FIG. 4.
Figure 9:
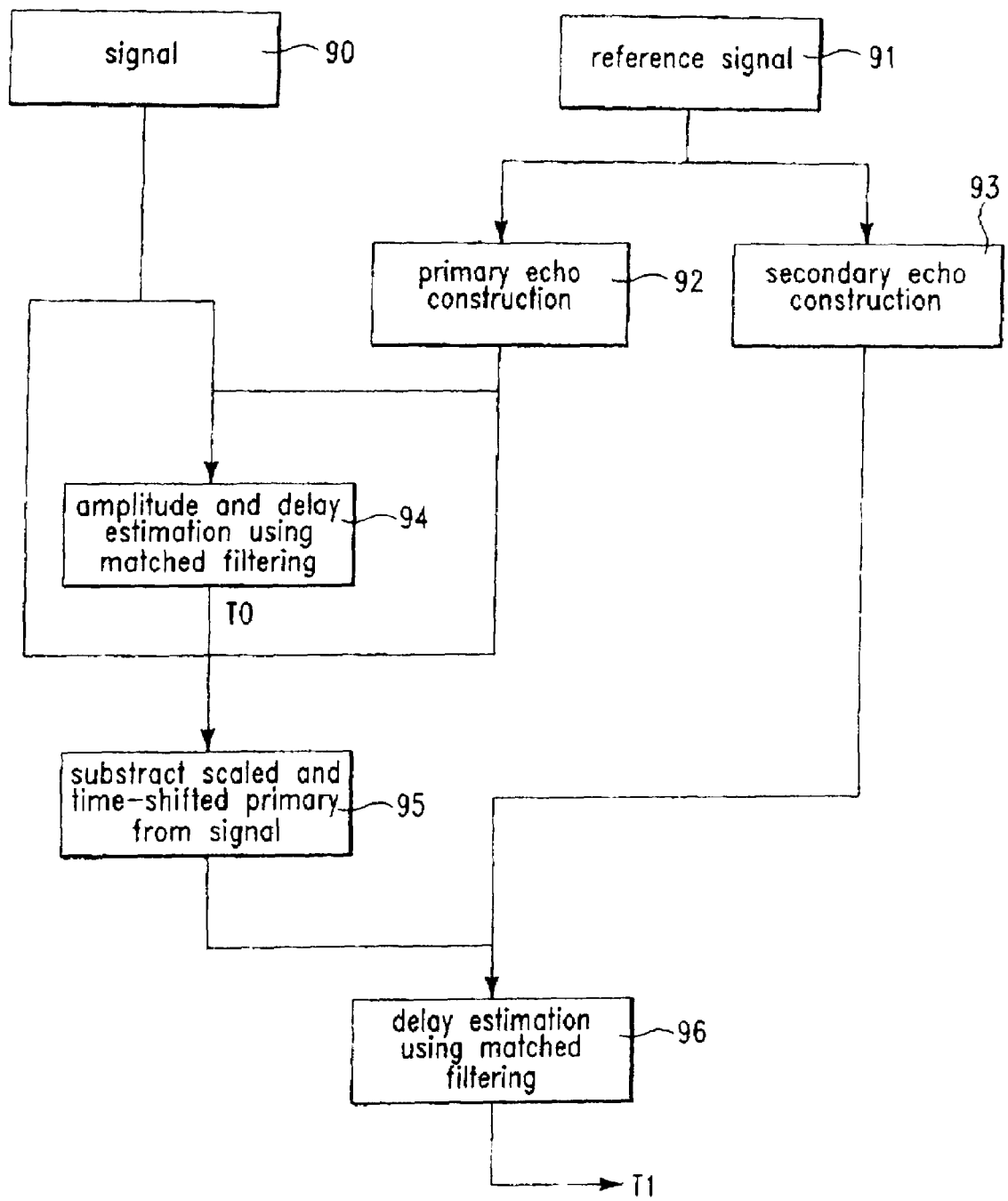
FIG. 9 is a flow chart illustrating a process according to an embodiment of the present invention for determining the thickness of a bonding layer that produces indistinguishable primary and secondary echoes.
Figure 10:
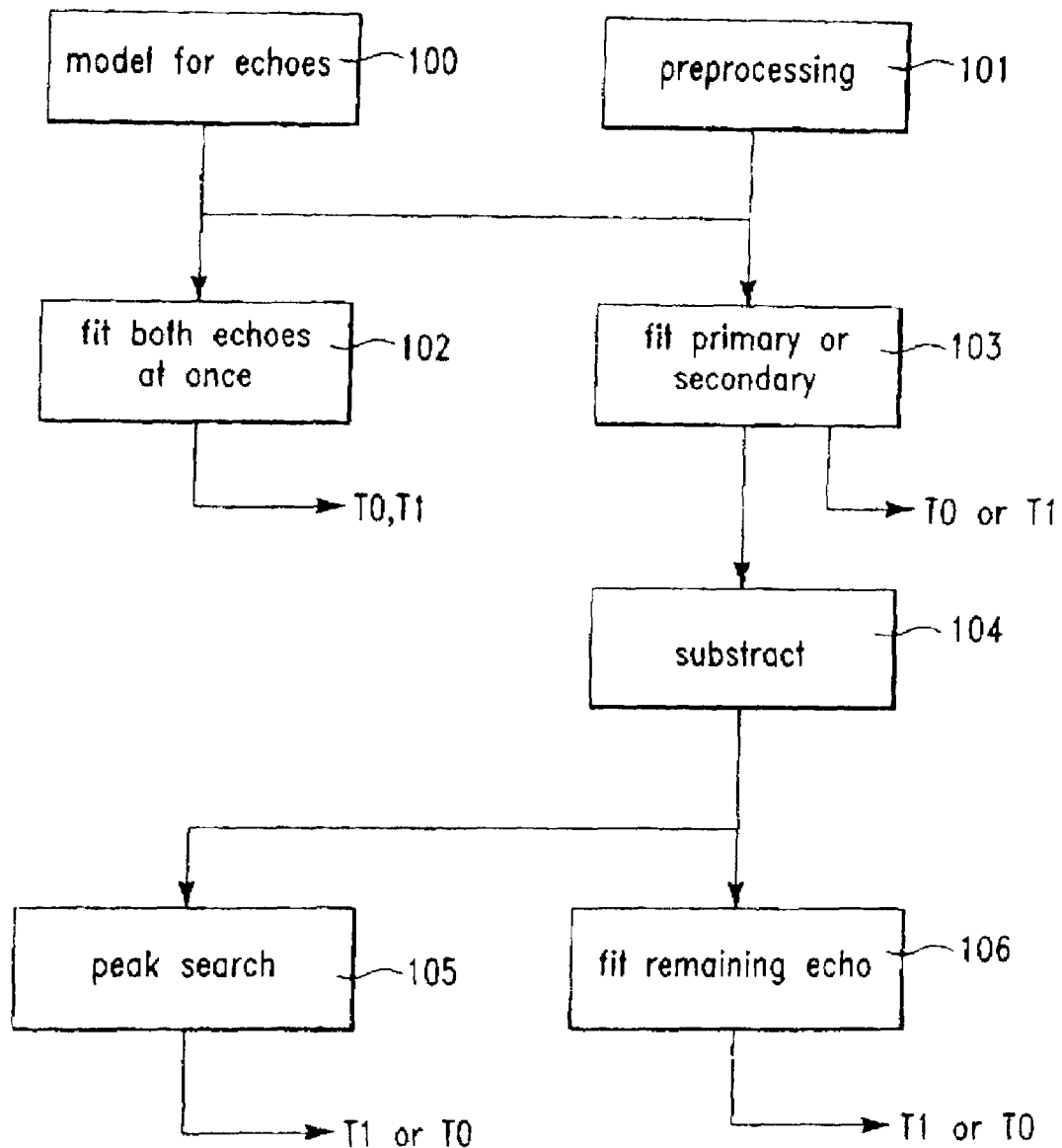
FIG. 10 is a flow chart of a generalized process for determining the thickness of a bonding layer that produces indistinguishable primary and secondary echoes.

More particularly the present invention uses a unique matched filtering technique, that will be described, below, in conjunction with FIGS. 7, 8, 9 and 10 where FIG. 7 shows the signal of FIG. 6, digitized into a time series; FIG. 8 shows how the time series shown in FIG. 6 is matched filtered with by the digital model of the primary echo shown in FIG. 4; FIG. 9 is a flow chart illustrating a process according to an embodiment of the present invention for determining the thickness of a bonding layer that produces indistinguishable primary and secondary echoes; and FIG. 10 is a flow chart of a generalized process for determining the thickness of a bonding layer that produces indistinguishable primary and secondary echoes.

Turning first to FIGS. 6 and 7, the displayed signal 40 shown in FIG. 6 is now digitized as previously described and is shown in FIG. 7 as the digitized time series 40a.

FIG. 8 illustrates the match filtering algorithm, which will match in this case the primary echo model 31a to the digitized signal 40a. As is illustrated in FIG. 8 when starting position n=0 of primary echo model p[n] 31a is aligned with n=c, illustrated by 31b, of digital series d[n] 40a, the match filtering function shall be maximized and thus will indicate the location of the previously indistinguishable primary echo.

Now the acoustic signal 40 shown in FIG. 6 is created when the bonding layer 15 of FIG. 1 is so thin that the primary and secondary echoes shown in FIG. 5 as 36 and 37 overlap and are effectively indistinguishable, will be digitized into a time series illustrated in 40a FIG. 7 and called d[n], let the length of d[n] be called Z, the acquisition of a signal d[n] corresponds to step 90 in FIG. 9.

(1.) an additive offset is added to d[n] so that the data are nearly zero far from the echoes.

(2.) Step 94 FIG. 9, d[n] is filtered using p[n] to produce the series q[n]:

$$q[n] = \sum_{i=0}^{N-1} d[n+i]\bar{p}[i],$$

$$n = 0, 1, 2, \ldots, Z - N$$

where:

$$\bar{p}[i] = \frac{p[i]}{\sum_{j=0}^{N-1} p[j]^2} \quad i = 0, 1, 2, \ldots, N-1$$

q[n] is now a separate time series containing the results of the summation corresponding to each point of time n. For example, in FIG. 8, the primary echo model 31a at a position of n=0 when iterated with the signal 40a d[n] shall produce, as an example only for this case, a q[0] value approximately equal to 0.

(3.) Step 94 FIG. 9, the index c which maximizes q[n] is related to the position of the primary echo in d[n]. For example, in FIG. 8 the primary echo model at position 31b when iterated with the signal 40a d[n] shall produce, as an example only for this case, the maximum of q[n] located at n=c. Similarly, the maximum q[c] is related to the scaling to be applied to p[n] to best fit the primary echo in d[n]. Note that the maximum is not necessarily calculated over the full extent of q[n], but rather over a sub-section corresponding to a range of positions where the echo might physically be present. In symbols, c=argmax$_I$q[n]

q$_{max}$=max$_I$q[n]=q[c]

where I is a subset of 0, 1, . . . , Z−1 corresponding to the range of positions being searched.

(4.) Step 95 FIG. 9, a new series u[n] is obtained by subtracting the scaled and time-shifted echo p[n] from d[n]:

$$u[n] = \begin{cases} d[n] - q_{max}p[n-c] & \text{for } c \le n < c+N \\ d[n] & \text{otherwise} \end{cases}$$

for n=0, . . . , Z−1. u[n] is hereafter referred to as the cleaned time-series.

(5.) Step 96 FIG. 9, the location of the secondary echo is obtained by filtering u[n] with s[n], much in the same way as step 3, to produce $$t[n] = \sum_{i=0}^{M-1} u[n+i]s[i]$$

$$n = 0, 1, 2, \ldots, Z - M$$

The index k which maximizes t[n] is related to the position of the secondary echo in u[n]. Note that the maximum is not necessarily calculated over the full extent of t[n], but rather over a sub-section corresponding to a range of positions where the secondary echo might physically be present. In symbols:

k=argmax$_J$t[n]

where J is a subset of 0, 1, . . . , Z−1 corresponding to the range of positions being searched.

The time difference T between the two echoes, i.e. the flight-time, is calculated from the values of the indices c and k: T=(k−c)Δt. The difference in indices is scaled by the sampling time Δt to obtain a time difference with physical units. Using the following equation:

D=VT/2 wherein, this time difference T and the longitudinal sound velocity V of the bonding layer 15 material are used to obtain the bonding layer thickness D.

It should now be obvious to one skilled in the art that variations to the above procedure can be made. In particular, the embodiment described above is only a special case of the more general method covered by the present application.

FIG. 10 is a flow chart of a generalized process for determining the thickness of a bonding layer that produces the indistinguishable primary and secondary echoes shown in FIG. 5.

As described in FIG. 10, a digital model 100 of the primary and secondary echoes is first constructed. These models can be constructed from data as described above (FIG. 3: 31a, 32a), from theoretical calculations based on the properties of the sample, or a mixture of both approaches.

Data are then acquired and digitized from an acoustic microscope. The data can be pre-processed using standard techniques, to reduce the amount of noise they contain, for instance 101 in FIG. 10.

A number of variations in the methods are then possible.

The first variation, step 102, of FIG. 10 finds the time locations of the primary and secondary echoes by directly finding the best match, or "fit", of the two echo models to the data simultaneously. This is done by constructing a numerical function with arguments being the time series acquired from the microscope and the models of the echoes, hereafter referred to as intrinsic arguments and arguments being the time location of the primary and secondary echoes, hereafter referred to as extrinsic arguments, and any number of other parameters, hereafter referred to as optional extrinsic arguments. The numerical function returns a single number related to the goodness of fit of the time series and models of the echoes after they have been transformed by operations parameterized by the function's extrinsic arguments. In other words, the extrinsic parameters and optional extrinsic parameters control how the primary and secondary echo models are transformed to construct a new time series that resemble as much as possible the data time series. The numerical function above calculate a single number i.e. the goodness of fit, which measures the distance between the data time series and this new time series constructed from the transformed models of the echoes. Fitting the echo models to the data time series refer to minimizing this distance by varying the extrinsic arguments or optional extrinsic arguments to the numerical function described above.

The transformations parameterized by the extrinsic arguments are time-translations of the primary and secondary echoes. The time-translation of an echo model is the change of its origin in time by a fixed amount corresponding to the new time location of the echo model.

Examples of optional extrinsic arguments include the amplitude of each echo, a time stretching factor to vary the width of each echo, together or separately, and an arbitrary offset to add to each echo. These optional extrinsic arguments are parameters controlling the following transformations of the echo models, respectively: a multiplication of each datum in the echo time series by a constant number, hereafter the amplitude scaling of the echo model, the multiplication of the point in time corresponding to each datum in the echo time series by a constant number, hereafter the time stretching of the echo model, the addition of a constant number to each datum in the echo time series, hereafter the offsetting of the echo model.

An example of such of function might be:

$$X(d[n], \bar{p}, \bar{s}, a_p, t_p, a_s, t_s) = \sum_{i=0}^{Z-1} (d[i] - a_p\bar{p}[i-t_p] - a_s\bar{s}[i-t_s])^2$$

where d[n] is the data time-series 40a, $\bar{p}$ and $\bar{s}$ are the normalized time-series representing the model of the primary and secondary echoes respectively [$\bar{p}$ and $\bar{s}$ are assumed to be zero outside the range of time indices where they are defined], $a_p$ and $a_s$ are the fitted amplitude of the primary and secondary echo models respectively, and $t_p$ and $t_s$ are the time location index of the primary and secondary echo models respectively. Z is the length of d[n]. In this example, d, $\bar{p}$ and $\bar{s}$ are the intrinsic arguments to the function, and ap, as, tp, and ts are the extrinsic arguments.

The numerical function is then minimized with respect to the extrinsic arguments, using a numerical algorithm on a computer. The extrinsic arguments can be allowed to vary only in a range of physically allowed values during this minimization. In the example above, this algorithm might be the Nelder-Mead algorithm. The difference between the resulting time location indices is then used to estimate the layer thickness using the same notation as above, $$D=V\Delta t(\hat{t}_s-\hat{t}_p)/2$$

where $\hat{t}_s$ and $\hat{t}_p$ now represent the time locations of the secondary and primary echoes, respectively, as returned by the minimization algorithm.

In the above mentioned example both the primary and secondary echoes are fitted simultaneously as shown in step 102. Alternatively, in step 103, a minimization function can be used to fit a single echo model to an undistinguishable acoustic digital signal. This echo would preferably be the primary echo, but it might also be the secondary echo. Using the same definitions as before, the intrinsic parameters of the minimization function would in this case be the time series acquired from the acoustic microscope and the time-series for the echo model. Extrinsic parameters would necessarily include the time location and amplitude of the echo, as well as any number of other parameters such as an additive offset, etc. The numerical function is then minimized with respect to the extrinsic arguments, using a numerical algorithm on a computer. The fit parameters are used to locate and scale the echo model, which is then subtracted from the digitized data step 104. The result of the subtraction is a new time-series which can be searched for the time location of the secondary echo. This search can be performed using a peak finding method (FIG. 10 step 105), or using yet another minimization function to fit and locate the remaining echo (FIG. 10 step 106). The minimization function would have for intrinsic arguments the new time-series and a model a the remaining echo, and would have for extrinsic arguments the time location and amplitude of the remaining echo, as well as any number of other parameters. As above, the bonding layer thickness would then be estimated from the difference of the time locations of the two echoes.

The embodiment of the invention is an example of this latter approach. The first minimization on the primary echo is performed by filtering d[n] using the filter p[n] matched to the primary echo, resulting in the time-series q[n]. The scaled and time-shifted primary echo is then subtracted from the data to generate the new time-series u[n]. The last minimization is performed by filtering u[n] using the filter s[n] matched to the secondary echo. The bonding layer thickness is estimated from the time location of the primary echo as estimated by the first minimization (c) and from the time location of the secondary echo as estimated by the second minimization (k), using the formula:

$$D=V(k-c)\Delta t/2.$$

Although an embodiment of the invention is comprised of a body 12 comprised of a first solid material 14, having an upper surface 19 and a lower surface 20, secured to a second material 16, having an upper surface 18, by a bonding layer 15 which forms a first interface 17 with layer 14 and a second interface 18 with layer 16 other variations can occur. For example, the present invention can also measure any thin surface layers bound to the body 12 where the bonded material is free, that is, the material 14 is in either a fluid or gaseous state (for example, water for an immersed body).

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for determining a thickness of a layer in a multi-layered body comprising:

selecting a body comprising a first layer having a lower surface and a second layer having an upper surface in contact with the lower surface of the first layer via a third layer forming a first interface with the lower surface of the first layer and a second interface with the upper surface of the second layer;

applying a wave to the body that will cause a primary echo to be reflected from the first interface and a secondary echo to be reflected from the second interface;

detecting and digitizing the primary echo and the secondary echo to generate a digital time series containing both of the echoes;

constructing a numerical function with intrinsic arguments that are the digital time series, primary and secondary echo models, and extrinsic arguments that are the time location and amplitude of the primary echo and secondary echo, in addition to other optional extrinsic arguments, to generate a function used to quantify a goodness of fit of the primary and secondary echo models, wherein the primary and secondary echo models are generated by:

selecting a second body similar to the body, the second body having the third layer sufficiently thick such that when a wave is applied to the second body, both primary and secondary echoes are fully distinguishable on an oscilloscope;

applying a wave to the second body to cause a primary echo to be reflected from the first interface and a secondary echo to be reflected from the second interface;

detecting and digitizing the echoes to generate a digital time series containing both echoes;

selecting two subsets of the time series with one of the subsets corresponding to the segment of the time series corresponding to the primary echo and the second of subsets corresponding to the segment of the time series corresponding to the secondary echo;

employing the subsets to form two new, shorter sub-time series corresponding to representation of the primary and secondary echoes; and using the sub-time series as models of the primary and secondary echoes;

maximizing the goodness of fit as quantified by the numerical function with respect to the extrinsic arguments or the optional extrinsic arguments;

determining a flight time in the third layer from a difference between the time locations of the primary and secondary echoes, and determining a thickness of the third layer of the body which is equal to one half of the determined flight time multiplied by the velocity of the wave in the third layer.

2. The method of claim 1 further comprising:
processing the digital time series to reduce noise therefrom.

3. The method of claim 1, further comprising:
averaging any number of similar digital time series measurements to reduce the effect of noise;
following generation of the primary and secondary echo models, a step of linearly interpolating first and last datum of both the sub-time series to zero to reduce edge transitions.

4. The method of claim 1, wherein one of the first, second or third layers in the body comprises a solid.

5. The method of claim 1, wherein two of the first, second or third layers in the body comprise solids.

6. The method of claim 1, wherein the first, second and third layers in the body comprise solids.

7. The method of claim 1, wherein the applied wave comprises an acoustic wave.

8. A method for determining a thickness of a layer in a multi-layered body comprising:
selecting a body comprising a first layer having a lower surface and a second layer having an upper surface in contact with the lower surface of a the first layer via a third layer forming a first interface with the lower surface of the first layer and a second interface with the upper surface of the second layer to secure the first layer to the second layer;

applying a wave to the body that will cause a primary echo to be reflected from the first interface and a secondary echo to be reflected from the second interface;

detecting and digitizing the primary echo and the secondary echo to generate a digital time series containing the primary echo and the secondary echo;

constructing a first numerical function with first intrinsic arguments that comprise the digital time series, a first model of a first echo, and first extrinsic arguments that are the time location and amplitude of the first echo, in addition to other first optional extrinsic arguments, to generate a function used to quantify a first goodness of fit of the first echo model;

maximizing the first goodness of fit as quantified by the first numerical function with respect to the first extrinsic arguments or the first optional extrinsic arguments;

transforming the first echo model using parameters obtained from a minimization algorithm;

subtracting the transformed first echo model from the time series to obtain a cleaned time series without the effect of the first echo;

constructing a second numerical function with second intrinsic arguments that comprise the cleaned time series, a second model of a second echo, and second extrinsic arguments that are the time location and amplitude of the second echo, in addition to other second optional extrinsic arguments, to generate a function used to quantify a second goodness of fit of the second echo model;

maximizing the second goodness of fit as quantified by the second numerical function with respect to the second extrinsic arguments or second optional extrinsic arguments;

determining the flight time in the third layer from an absolute value of a difference between the time locations of the first and second echoes from the parameters obtained from the maximization of the first goodness of fit quantified by the first numerical function and maximization of the second goodness of fit quantified by the second numerical function respectively; and determining the thickness of the third layer of the body which is equal to one half of the determined flight time multiplied by a velocity of the wave in the third layer.

9. The method of claim 8, wherein echo models are generated by:

selecting a second body similar to the body of claim 1, the second body having the third layer sufficiently thick such that when a wave is applied to the body, both primary and secondary echoes are fully distinguishable on an oscilloscope;

applying a wave to the second body to cause a primary echo to be reflected from the first interface and a secondary echo to be reflected from the second interface;

detecting and digitizing the primary and secondary echoes to generate a digital time series containing the primary and secondary echoes;

selecting two subsets of the time series with one of the subsets corresponding to a segment of the time series corresponding to the primary echo and a second of subsets corresponding to a segment of the time series corresponding to the secondary echo;

employing the subsets to form first and second shorter sub-time series corresponding to representation of the primary and secondary echoes respectively; and using the first and second sub-time series as models of the primary and secondary echoes.

10. The method of claim 8 further comprising:

processing the digital time series to reduce noise there from.

11. The method of claim 9 further comprising:

averaging any number of similar digital time series measurements to reduce the effect of noise;

following generation of the first and second echo models, a step of linearly interpolating first and last datum of the first and second sub-time series to zero to reduce edge transitions.

12. The method of claim 8, wherein one of the first, second or third layers in the body comprises a solid.

13. The method of claim 8, wherein two of the first, second or third layers in the body comprise solids.

14. The method of claims 8, wherein the first, second and third layers in the body comprise solids.

15. The method of claim 8, wherein:

the first numerical function q[n] is defined as the following equation:

$$q[n] = \sum_{i=0}^{N-1} d[n+i]\overline{p}[i],$$

$$n = 0, 1, 2, \ldots, Z - N$$

where:

$$\overline{p}[i] = \frac{p[i]}{\sum_{j=0}^{N-1} p[j]^2} \quad i = 0, 1, 2, \ldots, N-1$$

where d[n] is the digital time series and p[n] is a model of an echo;

the maximizing the first goodness of fit quantified by the first numerical function comprises locating time position c and amplitude $q_{max}$ at a maximum of q[n];

the transforming step comprises time-translating and scaling the model p[n] using the time position c and the amplitude $q_{max}$ such that $q_{max}$=q[c];

the subtracting step comprises subtracting the transformed model of the echo p [n] from the digital time series d[n] to obtain a cleaned time series u[n] without an effect of the echo, the subtracting step governed by the following equation:

$$u[n] = \begin{cases} d[n] - q_{\max} p[n-c] & \text{for } c \le n < c + N \\ d[n] & \text{otherwise} \end{cases}$$

where n=0,1,...,Z-1;

the second numerical function t[n] is defined as the following equation:

$$t[n] = \sum_{i=0}^{M-1} u[n+i]s[i]$$

$$n = 0, 1, 2, \ldots, Z - M$$

where u[n] is the cleaned time series and s[n] is the second echo model;

the maximization of the second goodness of fit quantified by the second numerical function comprises locating a time position k which will maximize t[n];

the flight time shall equal the absolute difference between determined by the indices c and k, multiplied by the sampling time of the time series.

16. The method of claim 8, wherein maximization of the second goodness of fit quantified by the second numerical function is achieved via:

estimating a time location of the second echo in the cleaned time series from the maximum excursion of the cleaned time series using a peak finding algorithm.

17. The method of claim 8, wherein the applied wave comprises an acoustic wave.

18. The method of claim 8, wherein:

the first model of the first echo comprises a model of the primary echo; and the second model of the second echo comprises a model of the secondary echo.

19. The method of claim 8 wherein:

the first model of the first echo comprises a model of the secondary echo; and the second model of the second echo comprises a model of the primary echo.

* * * * *